US008465835B2

(12) United States Patent
Guisinger

(10) Patent No.: US 8,465,835 B2
(45) Date of Patent: Jun. 18, 2013

(54) CAPSULES

(75) Inventor: Robert Guisinger, Beavercreek, OH (US)

(73) Assignee: Givaudan S.A., Vernier (CH)

( * ) Notice: Subject to any disclaimer, the term of this patent is extended or adjusted under 35 U.S.C. 154(b) by 350 days.

(21) Appl. No.: 12/438,430

(22) PCT Filed: Aug. 31, 2007

(86) PCT No.: PCT/CH2007/000432
§ 371 (c)(1),
(2), (4) Date: Mar. 30, 2009

(87) PCT Pub. No.: WO2008/031241
PCT Pub. Date: Mar. 20, 2008

(65) Prior Publication Data
US 2010/0003521 A1    Jan. 7, 2010

Related U.S. Application Data

(60) Provisional application No. 60/844,049, filed on Sep. 12, 2006.

(51) Int. Cl.
*B32B 1/06* (2006.01)
*B29C 39/10* (2006.01)
*B01J 13/22* (2006.01)

(52) U.S. Cl.
USPC ............... 428/402.2; 428/402; 428/402.21; 264/4; 264/4.3; 264/4.1

(58) Field of Classification Search
USPC ............... 428/402.2; 424/455; 264/4.3, 4.1
See application file for complete search history.

(56) References Cited

U.S. PATENT DOCUMENTS

| | | | | |
|---|---|---|---|---|
| 4,822,534 A | * | 4/1989 | Lencki et al. | ............. 264/4.3 |
| 6,039,901 A | | 3/2000 | Soper et al. | |
| 6,045,835 A | * | 4/2000 | Soper et al. | ............. 426/89 |
| 6,325,951 B1 | | 12/2001 | Soper et al. | |
| 2007/0292361 A1 | | 12/2007 | Virgallito et al. | |
| 2008/0112989 A1 | | 5/2008 | Wieland et al. | |
| 2008/0113018 A1 | | 5/2008 | Wieland et al. | |
| 2008/0277812 A1 | | 11/2008 | Guisinger et al. | |

FOREIGN PATENT DOCUMENTS

| | | |
|---|---|---|
| EP | 0856355 A2 | 5/1998 |
| WO | WO 03/084516 A1 | 10/2003 |

OTHER PUBLICATIONS

Poncelet, D. et al. "Productio of alginate beads by emulsification/internal gelation. I. Methodology" Apllied Microbiology and Biothechnology, vol. 38, 1992, p. 39-45.*
Poncelet et al., Applied Microbiology and Biothechnology, vol. 38, 1992, 39-45.*
A. Esquisabel, et al., "Production of BCG Alginate-PPL Microcapsules By Emulsification/internal Gelation", J.Microencapsulation, 1997, vol. 14, No. 5, p. 627-638. (XP000659518).
D. Poncelet, "Production of Alginate Beads by Emulsification/Internal Gelation", Annals of the New York Academy of Science, 2001, vol. 944, No. 1, p. 74-82. (XP002464386).
D. Poncelet, et al., Production of Alginate Beads by Emulsification/Internal Gelation. I. Methodology, Applied Microbiology and Biotechnology, Springer-Verlag, BE, 1992, vol. 38, p. 39-45. (XP009090637).
E. Quevedo, J. Steinbacher, D.T. McQuade, *Interfacial Polymerization within a Simplified Microfluidic Device: Capturing Capsules*, J.Am. Chem.Soc. 2005, 127, 10498-10499.
Excerpt from Römpp online, Hydrokolloide (in German), Aug. 2004.
English translation of Excerpt from Römpp online, Hydrokolloide, Aug. 2004.
A. Ström, M.A.K. Williams, *Controlled calcium release in the absence and presence of an ion-binding polymer*, Journal of Physical Chemistry B 2003, 107(40), 10995-10999.
Opposition filed by Henkel AG & Co. to corresponding European Patent No. EP 2 071 919 B1 (in German).
English Translation of Henkel's Opposition to corresponding European Patent No. EP 2 071 919 B1.

* cited by examiner

*Primary Examiner* — James J Seidleck
*Assistant Examiner* — S. Camilla Pourbohloul
(74) *Attorney, Agent, or Firm* — Curatolo Sidoti Co., LPA; Joseph G. Curatolo; Salvatore A. Sidoti

(57) ABSTRACT

A method of making core-shell capsules containing a water-immiscible liquid, comprising the steps of
  (a) dispersing into the water-immiscible liquid a crosslinking agent that is inactive under the conditions of the dispersion;
  (b) emulsifying the resulting dispersion into an aqueous solution of a crosslinkable hydrocolloid; and
  (c) activating the crosslinking agent to cause the hydrocolloid to crosslink at the dispersion/solution interface.

The method is simple and provides capsules that can be cold-loaded. The capsule material may be made of vegetable-derived materials.

15 Claims, No Drawings

CAPSULES

CROSS REFERENCE TO RELATED APPLICATIONS

This application is a national stage application of International Application No. PCT/CH2007/000432, filed 31 Aug. 2007, which claims the benefit of the filing date of U.S. Provisional Patent Application Ser. No. 60/844,049, filed 12 Sep. 2006, from which applications priority is claimed, and which are incorporated herein by reference.

This process relates to a method of preparing microcapsules, and more particularly to those utilising non-animal-derived hydrocolloids as wall material.

Hydrocolloids, colloidal suspensions of materials in water, are desirable materials for preparation of microcapsules, as they are readily and cheaply available from natural sources, both animal and vegetable. Typical examples are gelatine derived from various animals, and plant-derived gums, such as gellan gum. Some of these materials can be crosslinked, for example, by exposure to calcium or magnesium ions Previously, the formation of capsules has been achieved by coacervation, in which a shell is caused to form on dispersed core particles. This process has been used for many years, but it can be complex and difficult, often requiring very precise control of temperature and pH. It also uses animal derived materials (porcine, bovine, or piscine gelatine). This can be limiting, in that, in the case of flavors, many consumers do not wish to consume animal-derived products, either as a conscious vegetarian choice or in a desire to avoid animal-carried diseases, such as BSE ("mad cow disease").

It has now been found that it is possible to prepare core-shell capsules by a simple method that avoids the complexities of known methods. There is therefore provides a method of making core-shell capsules containing a water-immiscible liquid, comprising the steps of
(a) dispersing into the water-immiscible liquid a crosslinking agent that is inactive under the conditions of the dispersion;
(b) emulsifying the resulting dispersion into an aqueous solution of a crosslinkable hydrocolloid; and
(c) activating the crosslinking agent to cause the hydrocolloid to crosslink at the dispersion/solution interface.

There is additionally provided liquid-containing capsules preparable by a process as hereinabove described.

The liquid to be encapsulated may be any suitable, desired water-immiscible liquid. It is typically a flavor oil, but it may also be any liquid that is not appreciably soluble in water and whose encapsulation is desired, for example a pharmaceutical. Non-limiting examples of flavor oils include amyl octanoate, benzyl cinnamate, decyl acetate, geranyl isovalerate, limonene, methyl salicylate, nootkatone, octyl butyrate, 2-pentylthiophene, phenylethyl isothiocyanate, delta-tetradecalactone, 2,2'-thiodimethylenedifuran, trithioacetone, and vanillin isobutyrate The liquid may be used alone, or it may include a suitable water-immiscible solvent. The use of such solvents is already widely known and the skilled person will have no difficulty selecting a suitable solvent or solvent blend for any given application. One particularly desired solvent is MCT, medium chain triglycerides, which are readily-available commercial materials. These are essentially triesters of fatty acids with glycerol, and are low viscosity, low odor oils, which are stable to oxidation. A mixture of such liquids may be used, either separate in individual capsules or blended within the capsules. In addition, the liquid may be a solution of solid or gaseous material.

The hydrocolloid used in this invention may be any hydrocolloid suitable for use in encapsulation and able to be used in conjunction with the crosslinking agent, which will be described later in this description. Suitable hydrocolloids are generally derived from vegetable sources and they include (but are not limited to) food-grade alginate salts, pectin, curdlan gum and gellan gum. The potassium, sodium and ammonium alginates are all food-grade materials, sodium alginate being the most commonly encountered.

The crosslinking agent for use in this invention must be one that can be dissolved or dispersed into the encapsulated phase, that is inactive under the conditions of its dispersion or solution, and that can then be activated to crosslink the dissolved hydrocolloid in the continuous aqueous phase. Depending on the nature of the crosslinking agent, activation may be by any convenient means, such as temperature or pH change, irradiation or addition of an activating agent. In a typical example, the crosslinking agent may be calcium or magnesium ions. In such a case, calcium carbonate may be dispersed into the liquid to be encapsulated and the liquid in turn emulsified into an aqueous hydrocolloid solution, in which the hydrocolloid is crosslinkable by exposure to $Ca^{++}$ ions. At neutral pH, the calcium carbonate is water-insoluble. However, if the pH of the aqueous solution is made acidic, the calcium carbonate becomes more soluble and releases $Ca^{++}$ ions, which then cause crosslinking of the hydrocolloid at the droplet/aqueous solution interface to form a shell.

The process of the invention may be carried out easily in readily-available equipment.

The capsules may be made as capsules already loaded with the desired liquid to be encapsulated. Alternatively, they may be made as "blank" capsules and loaded with liquid when desired by any of the known methods of the art. Typical methods include those described in U.S. Pat. No. 6,045,835, the content whereof is included herein by reference.

The capsules so prepared may be used in any of the wide range of applications in which an encapsulated material is desirable. Non-limiting examples include foodstuffs of all kinds, such as ice cream and water ice, soups, broths, and stews, noodles, pastas, and rice, meats and cheeses, spices and spice blends, and fried foods; beverages of all kinds, such as brewed teas, carbonated beverages, alcoholic beverages, energy drinks, dairy products, and juices; confections, such as gums, chocolates and candies of all kinds; baked goods of all kinds, such as cakes, cookies and biscuits; medicinal preparations in solid, liquid or spray form, toothpastes, toothgels and tooth powders; mouthwashes; cosmetic preparations in the form of creams, lotions and sprays;

There is therefore also provided an application, comprising an application base and loaded capsules prepared as hereinabove described. By "application base" is meant a composition comprising all the other usual necessary ingredients that, in addition to the capsules, are needed to make up applications for use or consumption. The applications may contain all the standard ingredients that are required for the application to carry out its desired purpose, all being used in art-recognised quantities. Because of the many purposes to which applications according to this invention can be put, there are a great many of these and the list that follows is only a small sample, but the skilled person will readily be able to formulate any desired application using only the ordinary skill of the art. Typical examples include; pigments, coloring matters and dyestuffs; surfactants and emulsifiers; solvents and co-solvents; thickening agents and viscosity modifiers; fillers and extenders; antioxidants and preservatives; UV absorbers; foaming agents; defoaming agents; and the like.

The invention is now further described with reference to the following non-limiting examples.

EXAMPLE 1

Preparation of "Blank" Capsules

To a 1 liter beaker containing 495 g of distilled water, 5 g of sodium alginate (Keltone™ LV) was added. This mixture was stirred at moderate speed until the alginate was completely dissolved. To a 250 ml beaker containing 43.2 g of MCT, 2.8 g of finely-powdered $CaCO_3$ was added. This mixture was stirred at moderate speed to uniformly disperse the $CaCO_3$. This dispersion was added to the alginate solution, the pH of which was neutral, while stirring at moderate speed. When the desired droplet size of 100-500 microns was reached, 50% citric acid was added to lower the pH to 4.5. After several minutes, the batch became viscous and 500 g of distilled water was added to dilute the system. The batch was allowed to stir at moderate speed for several hours. Over this time period, the size of the capsules walls grew significantly. The following day, the capsules were concentrated and dried using conventional methods.

EXAMPLE 2

Preparation of Flavor-Containing Capsules

To a 2 liter beaker containing 995 g of distilled water, 5 g of sodium alginate (Keltone™ LV) was added. This mixture was stirred at high speed until the sodium alginate was completely dissolved. To a 250 ml beaker containing 43.2 g d-limonene, 2.8 g of finely-powdered $CaCO_3$ was added. This mixture was stirred at moderate speed to uniformly disperse the $CaCO_3$. This dispersion was added to the alginate solution, the pH of which was neutral, while stirring at moderate speed. When the desired droplet size of 500-1000 microns was achieved, 50% citric acid solution was added to lower the pH to 5. The pH of the batch was monitored while stirring at moderate speed. Over time, the pH rose and additional 50% citric acid solution was added to maintain the pH around 5. This was continued until the pH remained unchanged. The batch was allowed to stir overnight. Agitation was then stopped and the capsules were washed with fresh water and concentrated. The concentrated capsule slurry was then added to a 1 liter beaker containing 500 grams of a 2% $CaCl_2$ solution to finalize crosslinking and strengthen the walls. The capsules were stirred in this solution for several hours. The capsules were again washed with water to remove any residual $CaCl_2$ and stored in water.

EXAMPLE 3

Cold loading of Blank Capsules 14.6 g of dried capsules from example 1 and 1.4 g of water were mixed thoroughly to uniformly distribute the water. The capsule walls were allowed to for 15 minutes. 4 g of acetophenone was added to the hydrated capsules and the mixture mixed thoroughly and then allowed to stand overnight.

The release of the flavor into water was determined by dissolution of the loaded capsules into 500 ml 30° C. water. The capsules were found to release about 50% of the encapsulated flavor in 10 minutes and 75% in 30 minutes.

The invention claimed is:

1. A method of making core-shell capsules containing a water-immiscible liquid, comprising the steps of
    (a) dispersing into the water-immiscible liquid a crosslinking agent that is inactive under the conditions of the dispersion;
    (b) emulsifying the resulting dispersion into an aqueous solution of a crosslinkable hydrocolloid; and
    (c) activating the crosslinking agent to cause the hydrocolloid to crosslink at the dispersion/solution interface.

2. A method according to claim 1, in which the hydrocolloid is derived from a vegetable source.

3. A method according to claim 2, in which the hydrocolloid is at least one of a food-grade alginate salt, pectin, curdlan gum or gellan gum.

4. A method according to claim 1, in which the water-immiscible liquid to be encapsulated is a flavor oil or pharmaceutical present during the process of preparing the capsules.

5. A method according to claim 1, in which the water-immiscible liquid is water-immiscible solvent, the capsules are made as blank capsules and are loaded with a further water-immiscible liquid to be encapsulated in a subsequent step.

6. Liquid-containing core-shell capsules prepared according to claim 1.

7. Application comprising an application base and loaded core-shell capsules prepared according to claim 1.

8. The application according to claim 7, in which the hydrocolloid is derived from a vegetable source.

9. The application according to claim 7, in which the hydrocolloid is at least one of a food-grade alginate salt, pectin, curdlan gum or gellan gum.

10. The application according to claim 7, in which the water-immiscible liquid comprises a flavor oil.

11. The application according to claim 7, in which the water-immiscible liquid comprises a pharmaceutical.

12. The core-shell capsules according to claim 6, in which the hydrocolloid is derived from a vegetable source.

13. The core-shell capsules according to claim 6, in which the hydrocolloid is at least one of a food-grade alginate salt, pectin, curdlan gum or gellan gum.

14. The core-shell capsules according to claim 6, in which the water-immiscible liquid comprises a flavor oil.

15. The core-shell capsules according to claim 6, in which the water-immiscible liquid comprises a pharmaceutical.

* * * * *